United States Patent
Bandaru

(10) Patent No.: US 7,840,204 B2
(45) Date of Patent: Nov. 23, 2010

(54) SYSTEM AND METHOD FOR UNLOCKING WIRELESS COMMUNICATIONS DEVICE

(75) Inventor: Murali Krishna Bandaru, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 396 days.

(21) Appl. No.: 11/285,412

(22) Filed: Nov. 22, 2005

(65) Prior Publication Data

US 2007/0115091 A1 May 24, 2007

(51) Int. Cl.
*H04M 1/66* (2006.01)
*H04M 1/68* (2006.01)
*H04M 3/16* (2006.01)

(52) U.S. Cl. .................. 455/411; 455/410; 713/168; 713/171; 713/184; 726/4

(58) Field of Classification Search .................. 455/411, 455/558
See application file for complete search history.

(56) References Cited

U.S. PATENT DOCUMENTS

| | | | |
|---|---|---|---|
| 6,125,273 A | 9/2000 | Yamagishi | |
| 6,360,092 B1 * | 3/2002 | Carrara | 455/410 |
| 6,550,010 B1 | 4/2003 | Link, II et al. | |
| 6,950,647 B2 | 9/2005 | Ko | |
| 7,088,988 B2 * | 8/2006 | Kelkar et al. | 455/411 |
| 2003/0097211 A1 * | 5/2003 | Carroll et al. | 701/33 |
| 2003/0194987 A1 * | 10/2003 | Pattabiraman et al. | 455/403 |
| 2004/0097266 A1 * | 5/2004 | Aerrabotu et al. | 455/558 |
| 2004/0192268 A1 | 9/2004 | Pyhalammi | |
| 2006/0041746 A1 * | 2/2006 | Kirkup et al. | 713/168 |

* cited by examiner

*Primary Examiner*—Rafael Pérez-Gutiérrez
*Assistant Examiner*—Liton Miah

(57) ABSTRACT

An exemplary method for unlocking a wireless communications device comprises entering a backdoor screen, prompting input of a backdoor code, receiving the backdoor code, comparing the received backdoor code to a service validation code, and resetting an unlock code of the wireless communications device if the received backdoor code matches the service validation code. The service validation code may be, for example, a one time subsidy lock code, an operator master subsidy lock code, another service programming code or any other stored code not generally known to the user. The method may further comprise unlocking the wireless communications device if the received backdoor code matches the service validation code.

13 Claims, 2 Drawing Sheets

SYSTEM AND METHOD FOR UNLOCKING WIRELESS COMMUNICATIONS DEVICE

TECHNICAL FIELD

The present invention generally relates to wireless communications devices and more particularly to wireless communication security techniques.

BACKGROUND

Security techniques are implemented on wireless communications devices, also known as, mobile handsets. One such security technique involves "locking" access to device operations. As shown in the flow diagram 400 of FIG. 4, to unlock the device, the user must provide a correct code, e.g., through the keypad interface 404. The received password 406 is compared to a stored unlock code 408, also referred to herein as a lock code. If the user inputs the correct code, then the device is unlocked 410. If the user inputs the incorrect code, then the device remains locked. Some devices may allow the user to retry a password for a limited number of times as shown by alternate path 414. The use of the unlock code prevents, for example, unauthorized access to the device contents, and accidental initiation of a call.

Service providers commonly provide a default password for the unlock code, such as the last four digits of the devices phone number. The user also has the option to change the password to specify a secret code in order to enhance security. However, if the user forgets this user-defined code, he or she will be unable to unlock the phone. Generally, the user must bring the device to a service center as shown in block 412. The service center then attaches a programming tool, or other service tools, to the device to either clear the user-defined password or to look up the user-defined password. Once the user-defined password is determined, the user can then unlock and use the phone.

Although forgetting a password is not a frequent occurrence, the need for having to go to a service center to unlock a phone is often inconvenient for the user, and sometimes impractical. Not only does the user have to know the location of the service center, but also in situations such as emergencies, the user may not have the ability to go to the service center. This could leave the user stranded and in a dangerous situation since the wireless communications device is not usable.

SUMMARY

A method for unlocking a wireless communications device utilizing a backdoor code is disclosed. A user may utilize this backdoor code method if the device is locked and the user has forgotten the unlock code. Using this method, the user can avoid having to visit a service center to unlock the device. In one embodiment, the method comprises a providing a software or hardware structure in the device for inputting a backdoor code, for receiving the backdoor code, for comparing the received backdoor code to a service validation code, and for resetting an unlock code of the wireless communications device if the received backdoor code matches the service validation code. The service validation code may be, for example, a one time subsidy lock code, an operator master subsidy lock code, or another secret code that might exist in the phone and identified by the vendor or operator. In an example embodiment, the method further comprises unlocking the wireless communications device if the received backdoor code matches the service validation code.

In one embodiment of the invention, the device awaits input of a specific code character sequence to present a backdoor prompt screen to the user. The prompt screen requests a specific code from the user. The user may receive this code by contacting a service center. The code is then input into the device to complete the backdoor method of unlocking the phone.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
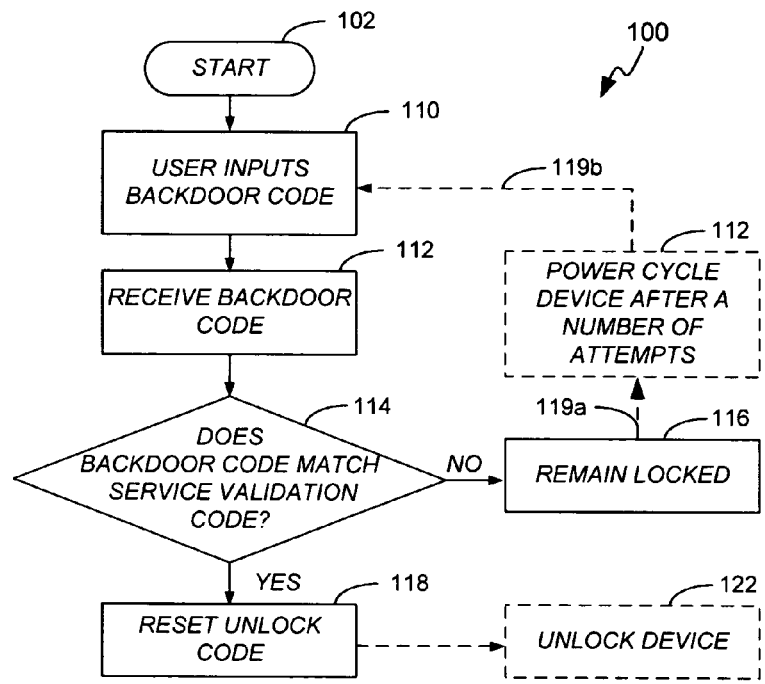
FIG. 1 is an exemplary logical flow diagram depicting a method for unlocking a wireless communications device according to one embodiment of the invention.

Referring to FIG. 1, there is shown an exemplary logical flow diagram 100 depicting a method for unlocking a wireless communications device according to one embodiment of the invention. Certain details and features have been left out of logical flow diagram 100 of FIG. 1 that are apparent to a person of ordinary skill in the art. For example, a step may consist of one or more sub-steps or may involve specialized equipment or materials, as known in the art. While steps 102 through 122 shown in logical flow diagram 100 are sufficient to describe one embodiment of the present invention, other embodiments of the invention may utilize steps different from those shown in logical flow diagram 100.

Prior to start block 102, a user wishes to unlock the device, but has forgotten the unlock code (also referred to as the lock code). A locked device as described herein means that some or all of the features of the device are inaccessible to or inoperable by a user. The method depicted by logical flow diagram 100 provides a means for the user to alternatively unlock the device. In one embodiment, the user enters a command, for example, by pressing a key sequence on a keypad of the device or by issuing commands via a touch screen display to initiate the method in start block 102. In another embodiment, the user may accesses a backdoor menu or screen to initiate the method 100. Other means for initiating method 100 may also be used with the present invention.

At block 110, the user inputs a backdoor code. This code is typically not known by the user. In one method, a backdoor code can be obtained by the user through the service provider of the device or through the manufacturer of the device. For example, the user can contact the service provider through another communications device. In some cases, even if the present device is locked, certain calls can be initiated such as emergency calls or calls to the service provider from the locked device to obtain the backdoor code.

According to one preferred embodiment of the invention, the backdoor code should match a service validation code. Typically, service validation codes are codes stored in the device, for example, in firmware or non-volatile memory, to allow device configuration by a service provider or a manufacturer of the device. These service validation codes are generally used when activating service on the device or otherwise servicing or programming the device. Thus, these service validation codes are not generally available to the end users. Contrary to conventional usage, the service validation codes provides a framework for alternatively unlocking the device as discussed in greater detail below in conjunction with block 114 of FIG. 1 and block 214 of FIG. 2. In other embodiments of the invention the backdoor codes can be compared against other device-specific codes, stored in the device, which are not generally known to end users.

Continuing with bock 110, in one embodiment, the backdoor code may be entered by the user after he or she accesses a special screen, or after being prompted in some manner by the device. For example, a message on a display can inform the user that the unlock code will be reset and requests the user to enter a backdoor code utilizing the device keypad. Other embodiments may use other device interfaces to prompt the user. In alternate embodiments, the user immediately inputs the backdoor code without prompts by entering a sequence of numbers and/or letters on a keypad of the phone.

Next at block 112, the device receives the backdoor code provided by the user. At decision block 114, the backdoor code is compared to a service validation code stored on the device. If the backdoor code matches the service validation code, then the phone will be unlocked and the unlock code is reset in block 118. In some cases the unlock code is reset to a default value allowing the user to enter the default value to unlock the device. For example, the default value of the unlock code may be all zeros or the last two digits of the Mobile Directory Number (MDN), that is, the actual phone number one would dial to reach that specific mobile phone, etc.

In other cases the unlock code may be simply cleared so that the unlock code is not required to unlock the device. In another embodiment, if the backdoor code matches the service validation code, then the phone remains locked, but the unlock code is reset in block 118. This then allows the user to input the rest unlock code to unlock the device in block 122. Alternately, the device automatically unlocks after receipt of the valid backdoor code.

If the backdoor code does not match the service validation code, at decision block 114, then the device remains locked as shown in block 116. The user must then reattempt to enter the correct backdoor code at block 110, as shown by path 119a and 199b. In one embodiment of the invention, the device may power cycle after a number of attempts as shown in block 112.

Figure 2:
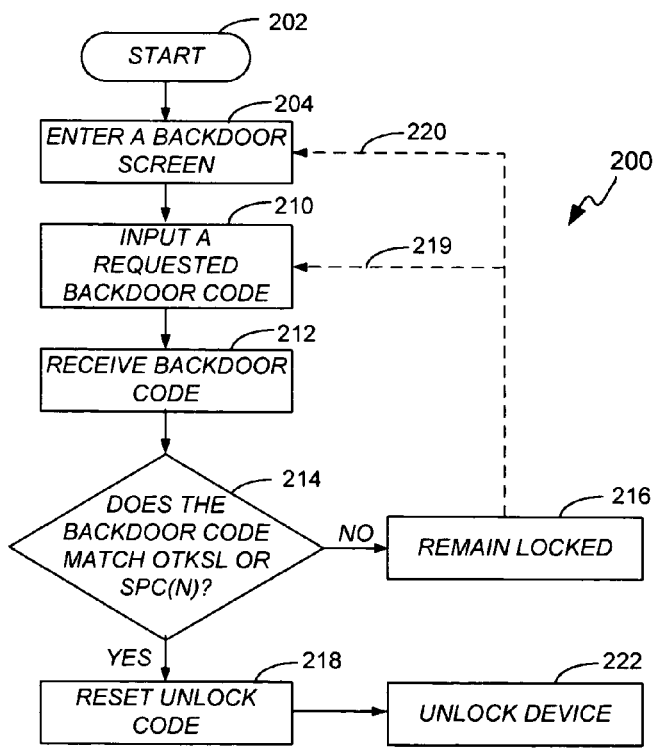
FIG. 2 is a logical flow diagram depicting a method for unlocking a wireless communications device according to another embodiment of the invention.

Referring to FIG. 2, there is shown an exemplary logical flow diagram 200 depicting a method for unlocking a wireless communications device according to another embodiment of the invention. Certain details and features have been left out of logical flow diagram 200 of FIG. 2 that are apparent to a person of ordinary skill in the art. For example, a step may consist of one or more sub-steps or may involve specialized equipment or materials, as known in the art. While steps 202 through 222 shown in logical flow diagram 200 are sufficient to describe one embodiment of the present invention, other embodiments of the invention may utilize steps different from those shown in logical flow diagram 200.

Prior to block 202, the user wishes to unlock the device but has forgotten the unlock code. As discussed above, service providers commonly provide a default password for the unlock code, such as the last four digits of the devices phone number. The user also has the option to change the password to specify a secret code in order to enhance security. To unlock the device if the password has been forgotten, the user must rely on a backdoor method as described herein. Steps 204 through 222 provide an alternative means for the user to unlock the device when the unlock code has been forgotten according to one embodiment of the invention.

In method 200 at block 204, the user enters into a backdoor screen by a method such as inputting a specific sequence of numbers into the device using a keypad or other interface on the device. Other methods for accessing the backdoor screen may also be utilized.

Continuing with FIG. 2, the backdoor screen provides prompts to the user to enter a backdoor code as shown in block 210. Such prompts may be initiated by any of several device interfaces. For example, the prompt issued by the device in block 210 may be displayed to the user on a screen of the device. In one embodiment, a message informs the user that the unlock code will be reset and requests the user to enter a backdoor code. In one embodiment prior to block 210, the device determines which backdoor code is available for use, and then specifically prompts the user in block 210 for the available backdoor code. As discussed above, the backdoor code can be obtained through the service provider or manufacturer of the device.

The backdoor code should match a service validation code according to one preferred embodiment of the invention. Service validation codes are codes stored in the device, for example, in firmware or non-volatile memory, to allow device configuration by a service provider or by a manufacturer. Generally, these service validation codes are used when activating service on the device or otherwise servicing or programming the device.

At block 212, the device receives the backdoor code entered by the user. Block 214 follows block 212. Block 214 is a particular implementation of decision block 114 of FIG. 1 according to one embodiment. In block 214, the service validation code may comprise more than one validation code. For example, a first validation code may be a one time subsidy lock code (OTKSL), and a second validation code may be an operator master subsidy lock code (SPC2). In certain embodiments a plurality of service programming codes (SPCn) may be stored in the device.

The OTKSL is generally used for limited programming of the device. For example, the OTKSL is used to initially provision the device by the service provider when the user first receives the wireless communications device. Sometimes the OTKSL is limited to a single use. However, in other embodiments, the OTKSL may be used repeatedly until a pre-determined limit is reach. Once the limit is reach the OTKSL parameter is not available. The SPC is used by the service provider and/or the manufacturer to service, repair, or program the wireless communications device. The OTKSL may be unique or the same for each device. The SPC is generally the same for each service provider, but also may be unique for each device. Thus, for method 200, it is preferable to use the OTKSL as the validation code rather than the SPC to prevent unauthorized access to sensitive device programming and data.

Referring again to FIG. 2, at decision block 214, the device determines if the entered backdoor code matches either the requested OTKSL or any of the requested service programming codes. Referring back to block 210, in one embodiment of the invention, the device determines if the OTKSL is available, that is, the device determines that OTKSL has not reached its limit of use, and prompts the user to enter the OTKSL. If the OTKSL is available, then at decision block 214, the backdoor code is compared to a OTKSL stored on the device. If the backdoor code matches the OTKSL, then the unlock code is reset in block 218. In some cases the unlock code is reset to a default value. In other cases the unlock code may be simply cleared so that the unlock code is not required to unlock the device. If the backdoor code does not match the OTKSL at decision block 214, then the device remains locked as shown in block 216. In one embodiment, the user can then be prompted to enter the correct backdoor code at block 210, as shown in path 219. In another embodiment, the user may have to re-enter the backdoor screen as shown in alternate path 220.

If the OTKSL is not available then the backdoor screen will request input of another available code at block 210. For example, in another embodiment at block 210, the backdoor screen specifically requests an SPC. At decision block 214, the entered backdoor code is compared to an SPC stored on the device. If the backdoor code matches the SPC, then the unlock code is reset in block 218. As discussed above, in some cases the unlock code is reset to a default value. In other cases the unlock code may be simply cleared so that the unlock code is not required to unlock the device. If the backdoor code does not match the SPC at decision block 214, then the device remains locked as shown in block 216. The user can then be prompted to enter the correct backdoor code at block 210, as shown in path 219, or the user must re-enter the backdoor screen at block 204, as shown in path 220. Following block 218, the device is unlocked at 222. The unlock device can now be operated by the user.

In another embodiment of the invention, the method may include more than one iteration of the blocks 210, 212, 214 and 216 by the return path 219. That is, an embodiment may require more than one backdoor code input into the device in a sequence as prompted by the backdoor screen.

The exemplary methods 100 and 200 of FIG. 1 and FIG. 2, respectively, provide alternative means for the user to unlock the device without having to provide the locked device to a service center. Contrary to conventional usage, the service validation codes provide a framework for alternatively unlocking the device as discussed above. In other embodiments of the invention the backdoor codes can be compared against other device-specific codes, stored in the device, which are not generally known to end users. Because these codes are stored in the device, the various embodiments of the invention utilize the stored codes as an alternative means for password validation to unlock the wireless communications device. The inconvenience, impracticability, and sometimes dangerous situations associated with conventional devices as discussed above are thus significantly minimized.

Figure 3:
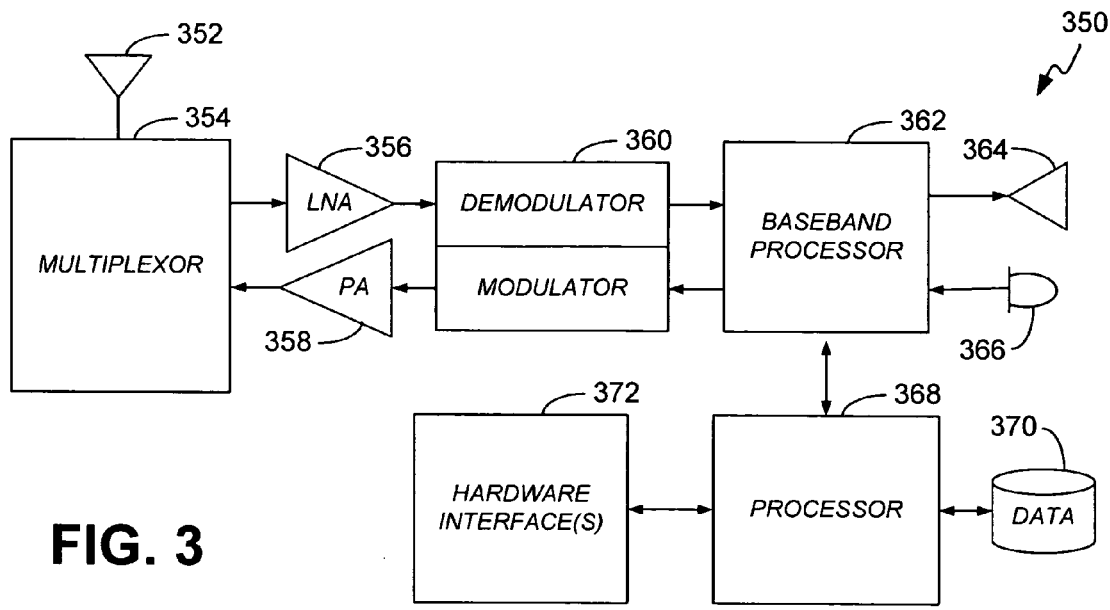
FIG. 3 is a block diagram illustrating an example wireless communications device operable to execute the methods depicted by FIGS. 1 and 2.
Figure 4:
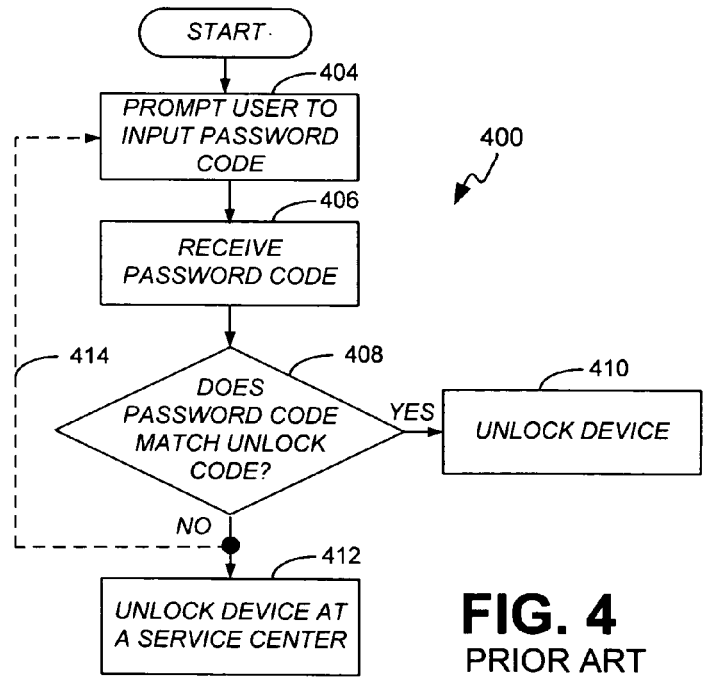
FIG. 4 is a flow diagram of the limited method of a prior art device.

FIG. 3 is a block diagram illustrating an exemplary wireless communications device 350 that may be used in connection with the various embodiments described herein. For example, the wireless communications device 350 may be used in conjunction with a handset or PDA network device. However, other wireless communications devices and/or architectures may also be used, as will be clear to those skilled in the art.

In the illustrated embodiment, wireless communications device 350 comprises an antenna 352, a multiplexor 354, a low noise amplifier ("LNA") 356, a power amplifier ("PA") 358, a modulation circuit 360, a baseband processor 362, a speaker 364, a microphone 366, a processor 368, a data storage area 370, and a hardware interface 372. Various user interface devices (not shown), such as keypads and display devices, may be communicably couple to hardware interface 372 for receiving user input and communicating output messages. In the wireless communications device 350, radio frequency ("RF") signals are transmitted and received by antenna 352. Elements 354, 356, 358, and 360 may be collectively referred to as a transceiver.

Multiplexor 354 acts as a switch, coupling antenna 352 between the transmit and receive signal paths. In the receive path, received RF signals are coupled from a multiplexor 354 to LNA 356. LNA 356 amplifies the received RF signal and couples the amplified signal to a demodulation portion of the modulation circuit 360. The demodulator strips away the RF carrier signal leaving a base-band receive signal, which is sent from the demodulator output to the base-band processor 362.

If the base-band receive audio signal contains audio information, then base-band processor 362 decodes the signal and converts it to an analog signal. Then the signal is amplified and sent to the speaker 364. The base-band processor 362 also receives analog audio signals from the microphone 366. These analog audio signals are converted to digital signals and encoded by the base-band processor 362. The base-band processor 362 also codes the digital signals for transmission and generates a base-band transmit audio signal that is routed to the modulator portion of modulation circuit 360. The modulator mixes the base-band transmit audio signal with an RF carrier signal generating an RF transmit signal that is routed to the power amplifier 358. The power amplifier 358 amplifies the RF transmit signal and routes it to the multiplexor 354 where the signal is switched to the antenna port for transmission by antenna 352.

The baseband processor 362 is also communicatively coupled with the processor 368. The processor 368 has access to a data storage area 370. The processor 368 is preferably configured to execute instructions embodied in software such as method 100 of FIG. 1 and method 200 of FIG. 2 that can be stored in the data storage area 370.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention. and substitutions without departing from the scope of the invention.

What is claimed is:

1. A method for unlocking a particular locked wireless communications device, comprising the steps of:
  identifying a one time subsidy lock code (OTKSL) that is used by the service provider to initially provision the particular locked wireless device, wherein the OTKSL is unique to the particular locked wireless device;

obtaining a first backdoor code from a service provider, wherein the backdoor code comprises the OTKSL that is unique to the particular locked wireless device, and the OTKSL is repeatedly used until a pre-determined OTKSL limit is reached;

receiving input of a character sequence for entering a backdoor screen;

displaying the backdoor screen;

prompting input of the first backdoor code on the backdoor screen displayed on the locked wireless device;

receiving the first backdoor code at the locked wireless device;

comparing the received first backdoor code to a stored OTKSL that is stored on the wireless device;

resetting a first unlock code for the wireless communications device if the received first backdoor code matches the stored OTKSL and the device determines that the OTKSL has not reached its limit of use;

prompting input for a second backdoor code, if the first backdoor code does not match the stored OTKSL, wherein the second backdoor code is a service programming code (SPC) that is the same for each wireless device associated with the service provider;

obtaining the second backdoor code from the service provider;

receiving the second backdoor code at the locked wireless device;

comparing the received second back door code to a stored SPC associated with the service provider that is stored on the wireless device; and resetting a second unlock code for the wireless communication device if the received second backdoor code matches the stored SPC;

wherein the steps of prompting, receiving and comparing are repeated for a plurality of requested backdoor codes.

2. The method of claim 1, further comprising the step of unlocking the wireless communications device if the received backdoor code matches a service validation code that allows a manufacturer of the wireless device to service the wireless devices.

3. The method of claim 2, wherein the service validation code includes a service programming code (SPCn) that is associated with the manufacturer of the wireless device.

4. The method of claim 3, wherein the service programming code includes an operator master subsidy lock code for programming of the wireless communications device.

5. A method for unlocking a particular locked wireless communications device, comprising the steps of:

identifying a one time subsidy lock code (OTKSL) that is used by the service provider to initially provision the particular locked wireless device, wherein the OTKSL is unique to the particular locked wireless device;

obtaining a first backdoor code from a service provider, wherein the backdoor code comprises the OTKSL that is unique to the particular locked wireless device, and the OTKSL is repeatedly used until a pre-determined OTKSL limit is reached;

receiving a backdoor input to enter a backdoor screen;

entering the backdoor screen upon receipt of the backdoor input;

prompting input of the first backdoor code on the backdoor screen displayed on the locked wireless device;

receiving the first backdoor code at the locked wireless device;

comparing the received first backdoor code to a stored OTKSL that is stored on the wireless device; unlocking the wireless communications device if the first backdoor code matches the stored OTKSL and the device determines that the OTKSL has not reached its limit of use;

prompting input for a second backdoor code, if the first backdoor code does not match the stored OTKSL, wherein the second backdoor code is a service programming code (SPC) that is the same for each wireless device associated with the service provider;

obtaining the second backdoor code from the service provider;

receiving the second backdoor code at the locked wireless device;

comparing the received second back door code to a stored SPC associated with the service provider that is stored on the wireless device; and resetting a second unlock code for the wireless communication device if the received second backdoor code matches the stored SPC;

wherein the steps of prompting, receiving and comparing are repeated for a plurality of requested backdoor codes.

6. The method of claim 5, further comprising the step of resetting an unlock code of the wireless communications device if the received backdoor code matches a service validation code that allows a manufacturer of the wireless device to service the wireless device.

7. The method of claim 5, wherein the backdoor input to enter the backdoor screen includes a pre-determined sequence of characters.

8. The method of claim 5, wherein the service validation code includes a service programming code that is associated with the manufacturer of the wireless device.

9. The method of claim 8, wherein the service programming code includes an operator master subsidy lock code.

10. A wireless communications device comprising:

a processor;

a memory coupled to the processor;

a transceiver coupled to the processor;

an input device coupled to the processor; and software executable by the processor for carrying out the method of:

identifying a one time subsidy lock code (OTKSL) that is used by the service provider to initially provision the particular locked wireless device, wherein the OTKSL is unique to the particular locked wireless device;

obtaining a first backdoor code from a service provider, wherein the backdoor code comprises the OTKSL that is unique to the particular locked wireless device, and the OTKSL is repeatedly used until a pre-determined OTKSL limit is reached, receiving a backdoor input to enter a backdoor screen;

entering the backdoor screen upon receipt of the backdoor input;

prompting input of the first backdoor code on the backdoor screen displayed on the locked wireless device, receiving the first backdoor code at the locked wireless device, comparing the received first backdoor code to a stored OTKSL that is stored on the wireless device;

resetting a first unlock code for the wireless communications device if the received first backdoor code matches the stored OTKSL and the device determines that the OTKSL has not reached its limit of use;

prompting input for a second backdoor code, if the first backdoor code does not match the stored OTKSL, wherein the second backdoor code is a service programming code (SPC) that is the same for each wireless device associated with the service provider;

obtaining the second backdoor code from the service provider;

receiving the second backdoor code at the locked wireless device;

comparing the received second back door code to a stored SPC associated with the service provider that is stored on the wireless device; and resetting a second unlock code for the wireless communication device if the received second backdoor code matches the stored SPC;

wherein the steps of prompting, receiving and comparing are repeated for a plurality of requested backdoor codes.

11. The device of claim 10, the method further comprising the step of unlocking the wireless communications device if the received backdoor code matches a service validation code that allows a manufacturer of the wireless device to service the wireless devices.

12. The device of claim 10, wherein the service validation code includes an operator master subsidy lock code for programming of the wireless communications device.

13. The device of claim 10, wherein the backdoor input includes a sequence of characters input on the input device.

* * * * *